United States Patent [19]

Ganguly et al.

[11] 4,278,999
[45] Jul. 14, 1981

[54] MOVING IMAGE SCANNER
[75] Inventors: Biswa N. Ganguly, Dayton, Ohio; Suresh C. Paranjpe, Dallas, Tex.
[73] Assignee: The Mead Corporation, Dayton, Ohio
[21] Appl. No.: 75,065
[22] Filed: Sep. 12, 1979
[51] Int. Cl.³ .......................... H04N 3/12; H04N 3/14
[52] U.S. Cl. .................................. 358/213; 358/109; 358/294
[58] Field of Search ............... 358/213, 293, 294, 109, 358/212

[56] References Cited

U.S. PATENT DOCUMENTS

| | | | |
|---|---|---|---|
| 3,478,211 | 11/1969 | Moser | 250/83 |
| 3,480,919 | 11/1969 | Jensen et al. | 340/173 |
| 3,604,846 | 9/1971 | Behane et al. | 178/67 |
| 3,629,495 | 12/1971 | Cahill | 358/296 |
| 3,814,846 | 6/1974 | Snow | 358/213 |
| 3,822,362 | 7/1974 | Weckler et al. | 358/213 |
| 3,833,762 | 9/1974 | Gudmundsen | 358/213 |
| 3,851,096 | 11/1974 | Collins et al. | 358/213 |
| 3,856,989 | 12/1974 | Weimer | 358/213 |
| 3,867,569 | 2/1975 | Watson | 358/213 |
| 3,911,467 | 10/1975 | Levine et al. | 358/213 |
| 3,932,775 | 1/1976 | Kosonocky | 307/311 |
| 3,940,602 | 2/1976 | Lagnado et al. | 235/181 |
| 3,967,055 | 6/1976 | Teer et al. | 358/213 |
| 3,995,107 | 11/1976 | Woywood | 358/213 |
| 4,004,079 | 1/1977 | Boston | 358/256 |
| 4,009,333 | 2/1977 | Berger et al. | 358/213 |
| 4,010,319 | 3/1977 | Levine | 358/213 |
| 4,011,442 | 3/1977 | Engeler | 358/213 |
| 4,012,587 | 3/1977 | Ochi et al. | 358/213 |
| 4,031,315 | 6/1977 | Pfleiderer | 358/212 |
| 4,032,976 | 6/1977 | Levine | 358/213 |
| 4,040,092 | 8/1977 | Carnes | 358/213 |
| 4,071,853 | 1/1978 | Yamawaka | 358/213 |
| 4,080,634 | 3/1978 | Schreiber | 358/298 |
| 4,081,841 | 3/1978 | Ochi | 358/213 |
| 4,084,190 | 4/1978 | Stein | 358/213 |
| 4,084,259 | 4/1978 | Cahill et al. | 364/900 |
| 4,106,061 | 8/1978 | Burnett | 358/296 |
| 4,107,550 | 8/1978 | Jacquart et al. | 307/241 |
| 4,117,514 | 9/1978 | Terui et al. | 358/213 |
| 4,122,496 | 10/1978 | Childress et al. | 358/298 |

OTHER PUBLICATIONS

Dyck et al.—A High Quantum Efficiency, Front Side Illuminated "CCD Area Image Sensor" Spie, vol. 116, Solid State Imaging Devices, 1977 pp. 19–23.
Fairchild Semi-Conductor Specification Sheet—"CCD 131 1024 Element Linear Image Sensor" 1976.
Hunt et al.—Diverse Electronic Imaging Applications For CCD Line Image Sensor—Conf. 1975 Internat. Conf. App. of CCD Devices—San Diego Cal. pp. 181–187, Oct. 29, 30 1975.
Carnes et al.,—Charge-Coupled Devices and Applications—RCA Lab Report 1973.
Thompson—Time—Delay and Integration CCD Applied to the Thematic Mapper—Spie—vol. 143–1978, pp. 19–26.
Hirschberg—A High Resolution Solid CCD Space—Borne Earth Imager—Spie—vol. 143–1978, pp. 2–10.

Primary Examiner—Joseph A. Orsino, Jr.
Attorney, Agent, or Firm—Biebel, French & Nauman

[57] ABSTRACT

An image scanner for scanning a document along a plurality of scan lines and providing a plurality of print control signal pulses in response to the image density of the document along the scan lines includes a means for projecting a moving document image onto a focal plane and a sensor array positioned in the focal plane. The sensor array includes columns of sensors extending parallel to the direction of image movement and a shift register associated with each column for sensors for shifting electrical outputs from the sensors in the direction of image movement. In a line copy mode of operation, the electrical outputs are shifted at the same rate at the rate of movement of the image such that the given pixel on the image is scanned sequentially by each of the sensors in a column. The electrical outputs are compared with a predetermined reference label to produce a print control signal. In a gray scale mode of operation, the outputs from all of the sensors in a sensor column are accumulated to produce an output related to the average image density of the area scanned by the column of sensors. The electrical outputs resulting from successively scanning overlapping image areas are integrated until a predetermined reference level is reached to produce a print control signal.

14 Claims, 5 Drawing Figures

MOVING IMAGE SCANNER

BACKGROUND OF THE INVENTION

The present invention relates to optical scanning devices and, more particularly, to an arrangement for scanning the image of a document along a plurality of scan lines and providing electrical signals related to the document image density along the scan lines. Such document scanners find particular application in duplicators or copiers in which printing occurs along print lines on a sheet of copy paper which correspond to the scan lines on the original document. An ink jet printer may advantageously be used in such a copier for depositing drops of ink along the respective print lines on the copy paper.

One such copier is shown in U.S. Pat. No. 4,106,061, issued Aug. 8, 1978, to Burnett. In the Burnett copier, the tone of a document image at successive points along parallel scan lines is sensed by means of a photodiode array, with each diode in the array receiving light reflected from points along an associated one of the scan lines on the document. Scanning is accomplished by means of a rotating mirror which is rotated in synchronism with the movement of a sheet of copy paper on a paper supporting drum. An ink jet print head mounted adjacent to the drum provides a plurality of jets, with each jet corresponding to one of the light-sensitive diodes. The outputs from the diodes are supplied for processing to a circuit which effectively combines gray scale and line copy processing techniques.

In general, when a document is scanned in a line copy mode, the measured image density is compared to a selected threshold level and if the density exceeds this threshold level, a print control pulse is supplied to the ink jet print head to cause a drop from the associated jet to be deposited on the print line. Thus, the resulting image has portions which are covered completely with ink and other portions which are left white. In a gray scale printing mode, however, drops are deposited in varying densities in areas of the copy paper to produce, collectively, the appearance of varying levels of gray. Thus, gray scale reproduction may be used to print an acceptable copy of a photograph, whereas a copy of the photograph which would result from line copy printing would be totally unacceptable. Various gray scale processing techniques, such as shown in the Burnett patent, have utilized integrator circuits for integrating the outputs from each of the photodiodes. When the integrated outputs exceed a predetermined threshold value, a print control pulse is generated. Burnett combines the line copy and gray scale circuits such that scanning across a thin black mark on the document results in immediate generation of a print control pulse, regardless of the operation of the integrator.

Various other gray scale techniques have been developed which provide for appropriately spaced dots or other marks within large areas on the copy such that the gray scale effect is achieved. Such systems are shown in U.S. Pat. No. 4,004,079, issued Jan. 18, 1977, to Boston; U.S. Pat. No. 4,084,259, issued Apr. 11, 1978, to Cahill et al; U.S. Pat. No. 4,080,634, issued Mar. 21, 1978, to Schreiber; and U.S. Pat. No. 3,604,846, issued Sept. 14, 1971, to Behane et al.

U.S. Pat. No. 4,122,496, issued Oct. 24, 1978, to Childress et al discloses a scanning arrangement in which scan signals are developed in correspondence to the light reflected from successive concentric sharp and unsharp areas of the document being scanned. The sharp and unsharp data signals are combined in accordance with a sharpness factor, having a predetermined value in accordance with the original image being scanned, to produce a succession of digital gray level data signals.

One rather recently developed scanning technique utilizes a charge coupled device (CCD) which defines an array of photosensitive sites which accumulate charges in dependence upon an image projected thereon. Such CCD imaging arrays are shown in U.S. Pat. Nos. 4,032,976, issued June 28, 1977, to Levine, and U.S. Pat. No. 4,117,514, issued Sept. 26, 1978, to Terui et al. In the Terui et al patent, a scanner is disclosed having vertical columns and horizontal rows of photosensors which transfer charges into vertical shift registers. The vertical shift registers shift the charges sequentially into corresponding stages in a horizontal shift register. The horizontal shift register is shifted rapidly to produce lines of scan data in a raster scan format. The Levine patent discloses a similar scanner arrangement, further including a temporary storage CCD array which is positioned between the photosensor array and the horizontal shift register.

U.S. Pat. No. 3,833,762, issued Sept. 3, 1974, discloses a CCD imager array in which charges accumulated within charge collecting regions of charge transfer channels are shifted in synchronization with the movement of an image projected upon the array. An image motion detector determines the rate of image motion and provides for charge transfer at a corresponding rate. This permits substantial imaging time for scanning a moving image without smearing the image. This technique presents a significant advantage over prior techniques which would require sampling at a relatively high rate to reduce image smear.

As discussed in "Time Delay and Integration Charge Coupled Devices (CCDs) Applied to the Thematic Mapper," Leslie L. Thompson, SPIE, Vol. 143 (1978), pp. 19–26, and "A High Resolution Solid Charge Coupled Device (CCD) Space-borne Earth Imager," Irving Hirschberg, SPIE, Vol. 143, (1978), pp. 2–10, shifting of charges in a CCD imager array in synchronization with image motion results not only in elimination of image smearing, as proposed by the Gudmunsen patent, but also provides the advantage that each pixel of the image being scanned is scanned by a succession of photosensors. The effective scan time for each pixel is therefore increased, thus permitting scanning at lower light levels and, additionally, increasing the signal to noise ratio and averaging out variations in photosensor response characteristics.

A need exists for a reliable image scanner for use in a copier including an ink jet printer which is capable of operating at high scanning rates with minimal document illumination and, additionally, which provides for the generation of print control data pulses in either a line copy mode or a gray scale mode.

SUMMARY OF THE INVENTION

An image scanner for scanning a document along a plurality of scan lines and providing a plurality of print control signal pulses in response to the image density of the document along the scan lines includes means for projecting a moving document image onto a focal plane. A sensor array is positioned in the focal plane, with the array comprising a first plurality of sensor groups positioned in a row. Each of the sensor groups includes a plurality of sensors which are positioned in a column for receiving light from respective pixel areas on the image along a corresponding one of the scan lines. The sensors provide electrical outputs related to the image density at respective pixel areas on the scan lines. Each of the columns of sensors extends substantially parallel to the direction of image motion.

A first plurality of column shift registers is provided with each such column shift register associated with a corresponding one of the sensor groups and including a plurality of register stages, with each stage receiving electrical output from a respective one of the sensors in the associated sensor group. Each such column shift register is responsive to a column shift signal for shifting the electrical outputs in the register stages to adjacent stages in the direction of image motion. The electrical outputs in each of the column shift registers are shifted toward an output stage.

A first row shift register defines a plurality of row register stages with each such row register stage associated with one of the output stages. The row shift register stores electrical outputs provided by the output stages and shifts the outputs to adjacent row register stages in response to a row shift signal. A plurality of register transfer gate means, each connecting an output stage of one of the first plurality of column shift registers and the respective row register stage associated therewith, transfer to each of the row register stages an electrical output from the associated output stage in response to a transfer signal.

A means is provided for generating the column shift signal, the transfer signal, and the row shift signal. The row shift signal is equal in frequency to the rate at which successive pixel areas along the scan lines are scanned by each sensor times the number of sensor groups in the sensor array. The transfer signal frequency equals the rate at which successive pixel areas along the scan lines are scanned by each sensor. The frequency of the column shift signal is selectable such that it equals either the rate at which successive pixel areas along the scan lines are scanned by each sensor, or the rate at which successive pixel areas along the scan lines are scanned by each sensor times the number of sensors in each of the sensor groups.

An output processing means is responsive to the row shift register for sequentially comparing each of the electrical outputs stored in the row shift register with a reference electrical potential and providing a print control signal pulse when an electrical output exceeds the reference electrical potential, thereby providing line copy print control signal pulses.

The electrical outputs stored in each stage of each of the column shift registers may be accumulated in respective output stages thereof prior to application to an associated row register stage in the row shift register. The output processor means thereafter accumulates individually the electrical outputs successively stored in each register stage of the row shift register and periodically compares the outputs so accumulated with a reference electrical potential. The output processor means provides a print control signal pulse when an accumulated output exceeds the reference electrical potential, thereby providing gray scale print control signal pulses.

Accordingly, it is an object of the present invention to provide an image scanner which scans a document along a plurality of scan lines to produce a plurality of print control signal pulses in response to the image density of the document along the scan lines; to provide such a scanner in which electrical outputs from a sensor array are applied to associated shift registers and shifted in synchronism with the movement of an image across the sensor array; to provide such a scanner in which the electrical outputs from each of the sensors in a sensor column are summed to produce an accumulated output which is thereafter integrated to provide print control signal pulses for gray scale reproduction of the document; and to provide a method of image scanning for scanning a document in which overlapping areas of the image are successively scanned with the image densities successively accumulated to produce gray scale print control signal pulses.

Other objects and advantages of the invention will be apparent from the following description, the accompanying drawings and the appended claims.

DETAILED DESCRIPTION OF THE PREFERRED EMBODIMENT

Figure 1:
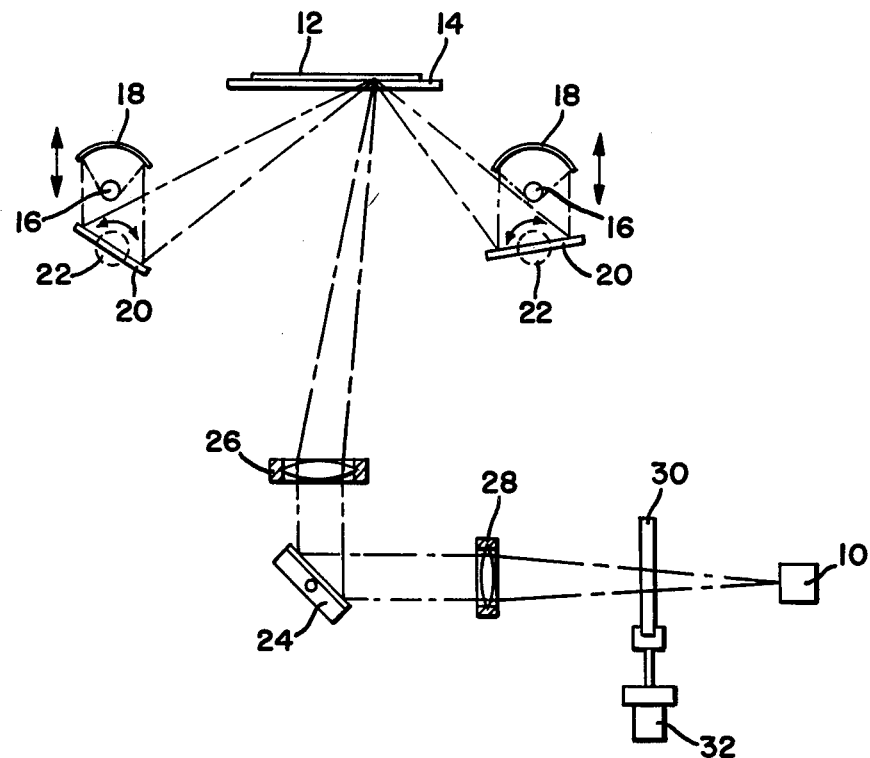
FIG. 1 is a diagrammatic representation of an optical system for use in the image scanner of the present invention.

The present invention relates to an image scanner for scanning a document along a plurality of scan lines and providing a plurality of print control signal pulses in response to the image density of the document along the scan lines. FIG. 1 of the drawings illustrates an optical system for projecting a moving document image onto a focal plane with a sensor array 10 positioned in the focal plane. A document 12 is mounted on a transparent platen 14 with the document image facing downward. A line of light is projected onto the document 12 by means of lamps 16, focusing mirrors 18, and flat-reflecting mirrors 20. As shown, reflecting mirrors 20 are rotated by motors 22, or by a mechanical linkage arrangement, such that the light from lamps 16 is swept across the document during scanning. As indicated, focusing mirrors 18 are raised and lowered during the scanning process by a mechanical linkage connected to mirrors 20 to maintain the line of light in sharp focus on the document 12. In synchronism with the rotation of mirrors 20, a scanning mirror 24 is rotated by a servo motor (not shown), or other means, such that light reflected from the illuminated area on the surface of the document 12 is directed to the sensor array 14 by lenses 26 and 28. Rotation of the mirror 24 is controlled such that scanning across the document 12 is performed at a substantially uniform scan rate.

A plurality of sensors are provided in the sensor array 10 such that a plurality of scan lines across the document 12 are simultaneously scanned. In one embodiment of the present invention, the scan lines which are scanned during one scanning pass across the document 12 are spaced apart by a distance which is four times that desired for the scan resolution across the width of the document. It is necessary, therefore, to scan the document four times, with the scan lines during each successive scan being laterally offset with respect to the scan lines previously scanned. Although the document 12 or the sensor array 10 could be laterally shifted after each successive scan to produce such a lateral offset of scan lines, a pane of glass 30 is provided which is rotated slightly by servo motor 32, after each scanning pass. Rotation of pane 30 shifts the image projected onto the sensor array 10 laterally by the desired distance. The details of this optical scanning system are more fully described in U.S. patent application, Ser. No. 075,063, filed on even date herewith and assigned to the assignee of the present invention. If desired, however, other optical scanning arrangements may be utilized in the present invention to project a moving image of the document being scanned onto the sensor array. Depending on the format of the printer operating in conjunction with the scanner of the present invention, for instance, it may be desirable to make only a single scanning pass across the document. In such an arrangement, it is necessary to scan all of the scan lines for the desired scan resolution simultaneously.

Figure 2:
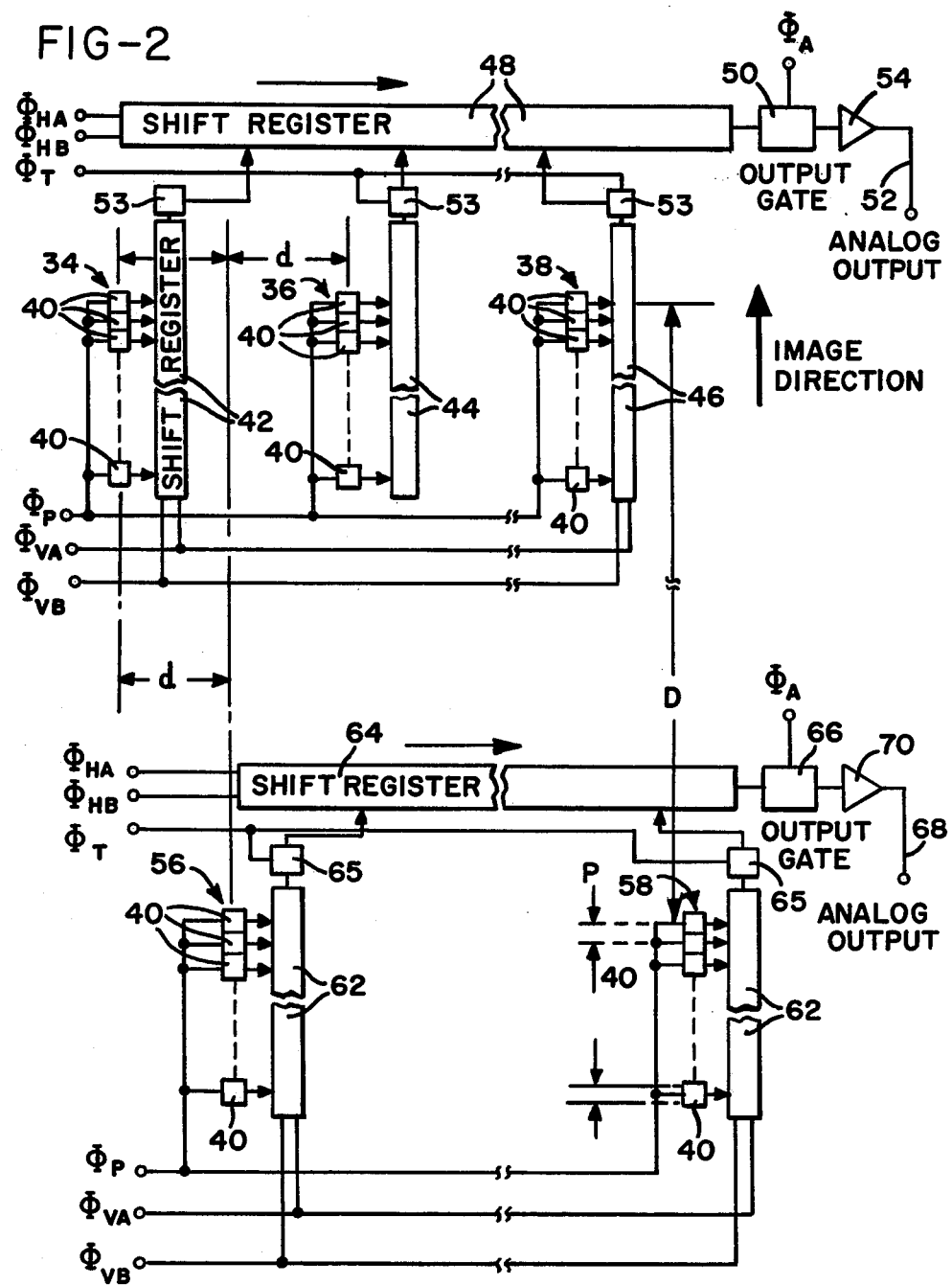
FIG. 2 is a schematic representation of the sensor array and column and shift registers of the image scanner of the present invention.

FIG. 2 illustrates the sensor array of the image scanner which is positioned generally in the focal plane of the optical system. The moving document image is projected onto the array, with the image moving across the array at a uniform rate in the direction indicated. A first plurality of sensor groups, indicated generally at 34, 36, and 38 are positioned in a row extending substantially perpendicular to the direction of image motion. Each of the sensor groups includes a plurality of sensors 40, typically photosensitive diodes, positioned in a column for receiving light from respective adjacent pixel areas on the image along a corresponding one of the scan lines. Although only three sensor groups are illustrated, it should be appreciated that many more such groups are provided in the array, with the number of groups corresponding to the number of scan lines serviced by the first plurality of sensor groups. Additionally, it will be appreciated that it may be desirable in some scanner applications to provide a plurality of sensor groups in a row which is inclined with respect to the direction of image motion.

Each sensor 40 accumulates an electrical charge which is dependent upon the amount of light striking the sensor. The sensors provide these accumulated charges as electrical outputs upon receipt of a signal $\phi_P$, with the electrical outputs therefore being related to the image density in the corresponding pixel areas along the scan lines being scanned. The signal $\phi_P$ is provided at a rate corresponding to the speed of movement of the image across the sensor array, such that the period of the $\phi_P$ signal corresponds to the time required for a given pixel area on the image to move the distance between adjacent sensors 40 in a column. Electrical outputs from the sensors 40 are each provided to a corresponding register stage within one of the column shift registers 42, 44, and 46, which may advantageously be charge coupled devices. Although only three such column shift registers are shown, it will be appreciated that such a register is provided for each sensor group in the array. Each column shift register includes a plurality of stages, with each stage receiving an electrical output from a respective one of the sensors 40 in the associated sensor group. Each of the column shift registers is responsive to a column shift signal, provided as signal $\phi_{VA}$ and $\phi_{VB}$, for shifting the electrical outputs in the register stages to adjacent stages in the direction of image motion. The electrical outputs in each shift register are shifted toward an output stage at the upper end of the column shift registers, with the output stage also receiving the electrical output from the uppermost sensor 40 in the associated sensor column.

A first row shift register 48 defines a plurality of row register stages, with each such row register stage associated with one of the output stages from the column shift registers. The row shift register 48, which may advantageously be a charge coupled device, stores the electrical outputs provided by the output stages of the column shift registers and shifts the outputs to adjacent row register stages in the direction indicated in response to a row shift signal, provided as signal $\phi_{HA}$ and $\phi_{HB}$. An output gate 50 is connected to the last stage of the row shift register 48 and, in response to an output signal $\phi_A$, supplies the electrical outputs from the shift register 48 sequentially to an analog output 52 via amplifier 54. A plurality of transfer gates 53 connect the output stage from each of the column shift registers to the respective row register stage associated therewith and transfer to each of the row register stages an electrical output from the associated output stage in response to a transfer signal $\phi_T$.

The sensor array further comprises a second plurality of sensor groups, only two of which are shown at 56 and 58, which are positioned in a second row extending substantially parallel to the first row of sensor groups and spaced therefrom in the direction of image motion by a predetermined distance D. Each of the second plurality of sensor groups includes a plurality of sensors 40 positioned in a column extending substantially parallel to the direction of image motion. Sensors 40 in each of the second plurality of sensor groups receive light from respective pixel areas on the document image along a corresponding one of the scan lines. The scan lines serviced by the second plurality of sensor groups interlace with the scan lines serviced by the first plurality of sensor groups. It should be appreciated that while this use of two sensor groups provides a substantial increase in resolution over the use of one sensor group, a scanner according to the present invention may preferably include only one such sensor groups in certain circumstances. One sensor group may provide the desired resolution, depending upon the displacement between adjacent scan lines, for the printer operating in conjunction with the scanner, for instance.

A second plurality of column shift registers, only two of which are shown at 62, are each associated with a corresponding one of the second plurality of sensor groups. Each of the column shift registers may be a charge coupled device including a plurality of register stages, with each stage receiving an electrical output from a respective one of the sensors 40 in the associated one of the second plurality of sensor groups upon receipt of a $\phi_P$ signal. Each of the column shift registers is responsive to a column shift signal, provided as signal $\phi_{VA}$ and $\phi_{VB}$, for shifting the electrical outputs in the register stages to adjacent stages in the direction of image motion. The electrical outputs are shifted toward an output stage at the top of each of the column shift registers, which may also receive the electrical output from the uppermost sensor. A second row shift register 64, comprising a CCD register, defines a plurality of row register stages, with each such row register stage being associated with one of the output stages of the second plurality of shift registers. The second row shift register 64 receives electrical outputs from transfer gate 65, actuated by transfer signal $\phi_T$, and stores the electrical outputs provided by the output stages of the column shift registers. Register 64 shifts these outputs to adjacent row register stages in response to a row shift signal, provided as signal $\phi_{HA}$ and $\phi_{HB}$. An output gate 66 provides the outputs from the last stage of shift register 64 to output 68 via amplifier 70, in response to an output gate signal $\phi_A$.

It will be appreciated that only a few of the columns of sensors 40 and associated column shift registers are shown in the circuit schematic. In a sensor array, capable of scanning a document image on an 8½ inch wide document in four scanning passes, with adjacent scan lines spaced apart by 2 mils, 1,134 such columns of sensors are required. In such an arrangement, it will be appreciated that interlacing sensor columns in the two sensor groups are spaced apart by a distance d which is 4 times the distance between scan lines on the document image. If no image magnification or demagnification is provided for projection of the document image onto the sensor array, the distance d is 8 mils. By utilizing two rows of sensor groups, as shown in FIG. 2, the spacing between adjacent sensor groups in each row is doubled, facilitating construction of the sensor array. Additionally, the displacement D between the rows of sensor groups may be selected such that it corresponds to the displacement between two parallel rows of jet drop streams in the ink jet printer used to reproduce the document image. By such a scanner array arrangement, the delay which is required for the print control signals supplied to the "downstream" row of jets is provided, since the positioning of the sensor groups corresponds to the positions of the jets produced by the ink jet print head.

Figure 3:
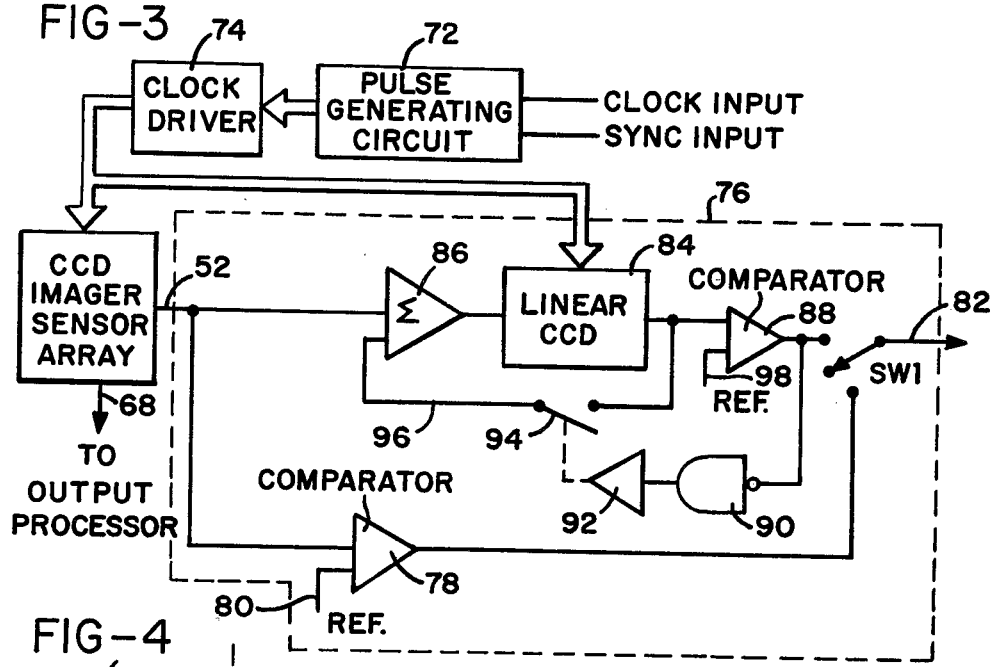
FIG. 3 is a schematic representation of the output processor circuit and timing circuits for the image scanner of the present invention.
Figure 4:
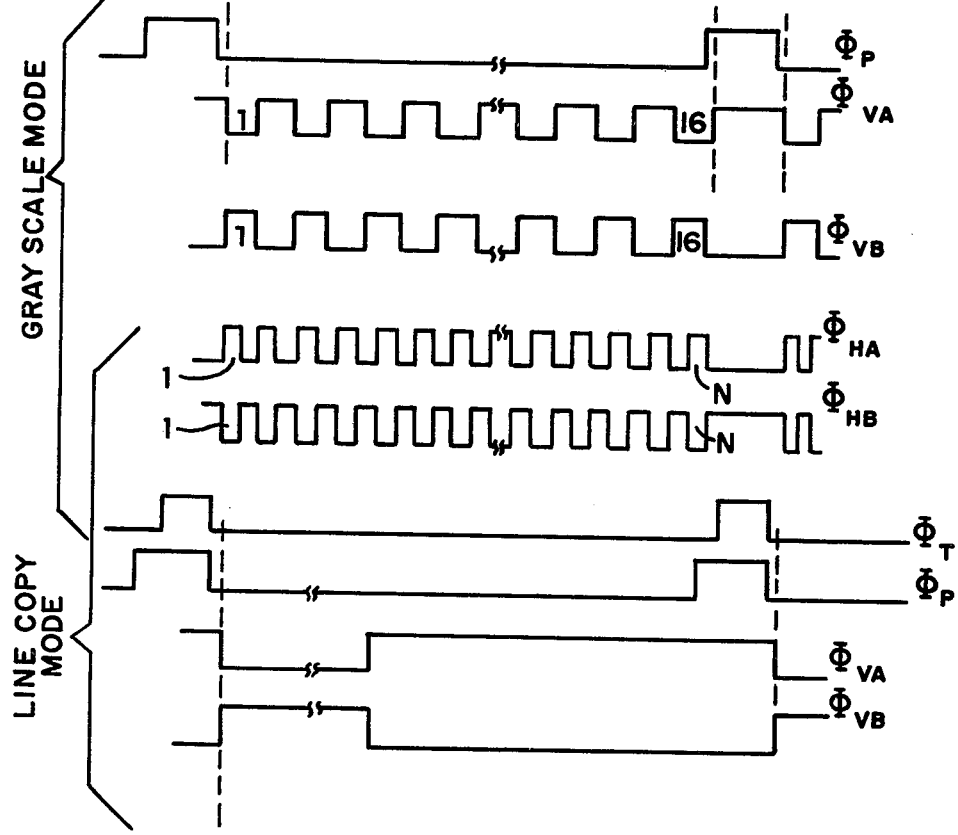
FIG. 4 is a timing diagram, showing timing of various control signals, useful in explaining the operation of the circuit of the present invention.

Reference is now made to FIGS. 3 and 4 which illustrate the output processor and timing circuitry for the image scanner of the present invention and the manner in which the output processor and image scanner operate. A pulse generating circuit 72 and a clock driver circuit 74 provide a means for generating the column shift signal, $\phi_{VA}$ and $\phi_{VB}$, and the row shift signal, $\phi_{HA}$ and $\phi_{HB}$, as well as the sensor signal, $\phi_P$, the output gate signal, $\phi_A$, and the gate transfer signal $\phi_T$. As described more completely below, the row shift signal, $\phi_{HA}$ and $\phi_{HB}$, is equal in frequency to the rate at which adjacent pixels along the scan lines are scanned by each sensor, times the number of sensor groups in one of the sensor group rows. Thus, the row shift registers 48 and 64 are shifted by signals $\phi_{HA}$ and $\phi_{HB}$ at a rate equal to N, the number of sensor groups connected to a row shift register, times the rate at which successive pixels along a scan line are scanned by a single sensor (the pixel rate or frequency).

The period of the pixel frequency is equal to the time that it takes for one pixel of the image projected onto the sensor array to move the distance P (FIG. 2) between adjacent sensors 40 in a sensor column. Signal $\phi_P$, having a frequency equal to the pixel rate, causes the charges from the sensors to be applied to the corresponding column register stages at the pixel frequency. Signal $\phi_T$, having a frequency equal to the pixel rate but lagging the signal $\phi_P$ by a short time period, causes the electrical outputs in the column shift register output stages to be transferred to respective row register stages at the pixel frequency. As seen in FIG. 4, the frequency of the signal $\phi_{HA}$ and $\phi_{HB}$ is equal to N times the pixel rate. Thus, CCD shift registers 48 and 64, defining N stages, one such stage associated with each of the sensor columns, are shifted such that they are completely cleared during each pixel time period.

As seen in the line copy mode timing diagram of FIG. 4, the column shift signal, consisting of $\phi_{VA}$ and $\phi_{VB}$, may be selected such that its frequency equals the rate at which successive pixel areas along the scan lines are scanned by each sensor. In such an arrangement, a sensor scans a pixel of the image during one pixel time period and, thereafter, transfers the accumulated charge into an associated stage of the column shift register. The charge is then shifted to the next adjacent column shift register stage in the same direction as the image. At this point, the adjacent sensor in the sensor column views the same pixel area of the image and, subsequently, transfers its accumulated charge into the associated shift register stage in which the previously transferred charge is stored. By repeating this process along the entire column of sensors, one pixel of image information is scanned by each of the sensors 40 in the column and the accumulated charges from each of the sensors are added together and provided at the output stage of the shift register. Thus, each pixel of the image along a scan line is scanned as many times as the number M of sensors in the sensor column. The output from the column shift register is therefore equal to $\overline{Mq}$, where $\overline{q}$ is the average charge generated at each photosensor.

This arrangement increases the signal to noise ratio by a factor of the $\sqrt{M}$. Additionally, nonuniformity of response of the sensors is substantially eliminated by averaging the charge accumulated for each pixel over M sensors. This is significant since response uniformity can vary as much as an order of magnitude for such an array of sensors. Finally, the effective dynamic range of the electrical output is increased by a factor of M.

The line copy mode electrical outputs on lines 52 and 68 from the sensor array are supplied to a pair of identical processor circuits 76, only one of which is shown in FIG. 3. The processor circuit associated with the second plurality of sensor groups is deleted for the sake of clarity. Circuit 76, when operating in the line copy mode has switch SW1 switched into its lower switch position. The electrical outputs from row shift register 48 are sequentially compared by comparator 78 with a reference electrical potential supplied to line 80. A print control pulse is generated by comparator 78 and applied to output line 82 via switch SW1 when the electrical output on line 52 exceeds the reference electrical potential. The reference 80 is set at a level intermediate "white" and "black" response levels.

It will be appreciated that when a document having an area of a very light gray tone is scanned, the reference potential will not be exceeded and, therefore, this area will appear on the document copy as white. When it is desired to operate in a gray scale mode, however, switch SW1 is switched into its upper switching position such that the output line 82 receives print control signal pulses from the portion of the processor circuit including linear CCD shift register 84, summer 86, comparator 88, gate 90, amplifier 92, and switch 94. Additionally, in the gray scale mode of operation, the frequency of the column shift signal $\phi_{VA}$ and $\phi_{VB}$ is adjusted such that it equals the pixel rate times the number of sensors in each of the sensor groups. Thus, in the case illustrated, where each column of sensors in a sensor group comprises 16 sensors, the signal $\phi_{VA}$ and $\phi{VB}$ is provided at 16 times the pixel rate. The effect of increasing the column shift signal frequency is to sample each of the 16 pixel areas being scanned by the sensors in a sensor column, shift the charges into the column shift register associated with the sensors, and then accumulate all of the charges from the 16 pixel areas in the output stage of the column shift register. The electrical output so provided in the output stage, therefore, is a function of the sum of the image densities in an area 1 pixel wide and 16 pixels long, extending along the scan line.

The accumulated charges in the output stage of each column shift register are transferred by the transfer gates into the row register and then shifted out to the processor circuit during each pixel period. During the next successive pixel time, an overlapping area, 16 pixels long and 1 pixel wide, along each scan line is scanned and charges accumulated in the output stages of the column shift registers in dependence upon the image density in the respective scanned area. Outputs corresponding to a series of image densities from successive overlapping areas along the scan line are summed by the processing circuitry 76 and compared after each summing operation to a reference signal which is proportional to a reference density. The accumulated image density output, when it exceeds the reference density level, results in the generation of a print control signal pulse.

To effect this gray scale processing technique, each output from the image array on line 52 is summed by a summer means including summer 86 for providing a summer output equal to the sum of the electrical output from the row shift register 48 and the input applied to a feedback input 96. The feedback input 96 receives the previously accumulated electrical output from the corresponding column of sensors in the sensor array. A shift register means, including linear CCD shift register 84, has the same number of stages as the row shift register 48. The shift register 84 receives the summer output signals and shifts the summer output signals through the shift register in response to the row shift signal $\phi_{HA}$ and $\phi_{HB}$ to a last shift register stage at the opposite end of the shift register. Thus, stored in the linear CCD shift register 84 are accumulated outputs from each of the sensor columns which outputs correspond to the sum of the image densities in the previously scanned overlapping areas. A feedback means, including line 96 and switch 94, is responsive to a feedback control signal from amplifier 92 for supplying the output from the last shift register stage of register 84 to the feedback input of the summer 86. A comparator means including comparator 88 compares the output for the last shift register stage of register 84 with a reference electrical potential on line 98 and provides a print control signal pulse to line 82 via switch SW1 when the output from the last shift register stage of register 84 exceeds the reference electrical potential on line 98.

A means, including the gate 90 and amplifier 92, is responsive to the occurrence of the print control signal pulse output from comparator 88 for preventing the feedback means from supplying the output from the last shift register stage to the feedback input of the summer 86 when this output exceeds the reference electrical potential on line 98. When the comparator 88 provides a pulse output, gate 90 and amplifier 92 cause switch 94 to be opened, thus disabling the feedback path from the output of the linear CCD shift register 84. Thus, the gray scale circuitry of processor circuit 76 operates in a multiplex configuration to integrate and compare successively scanned overlapping areas from each of the individual sensor columns until a reference level is exceeded. At this point, the feedback line is momentarily opened, thus effectively terminating the integration operation and permitting a new integration process to be started. It will be appreciated that while the switch 94 and the switch SW1 are shown as simple mechanical switches for the sake of clarity, transistor switching would be utilized to perform these operations.

Figure 5:
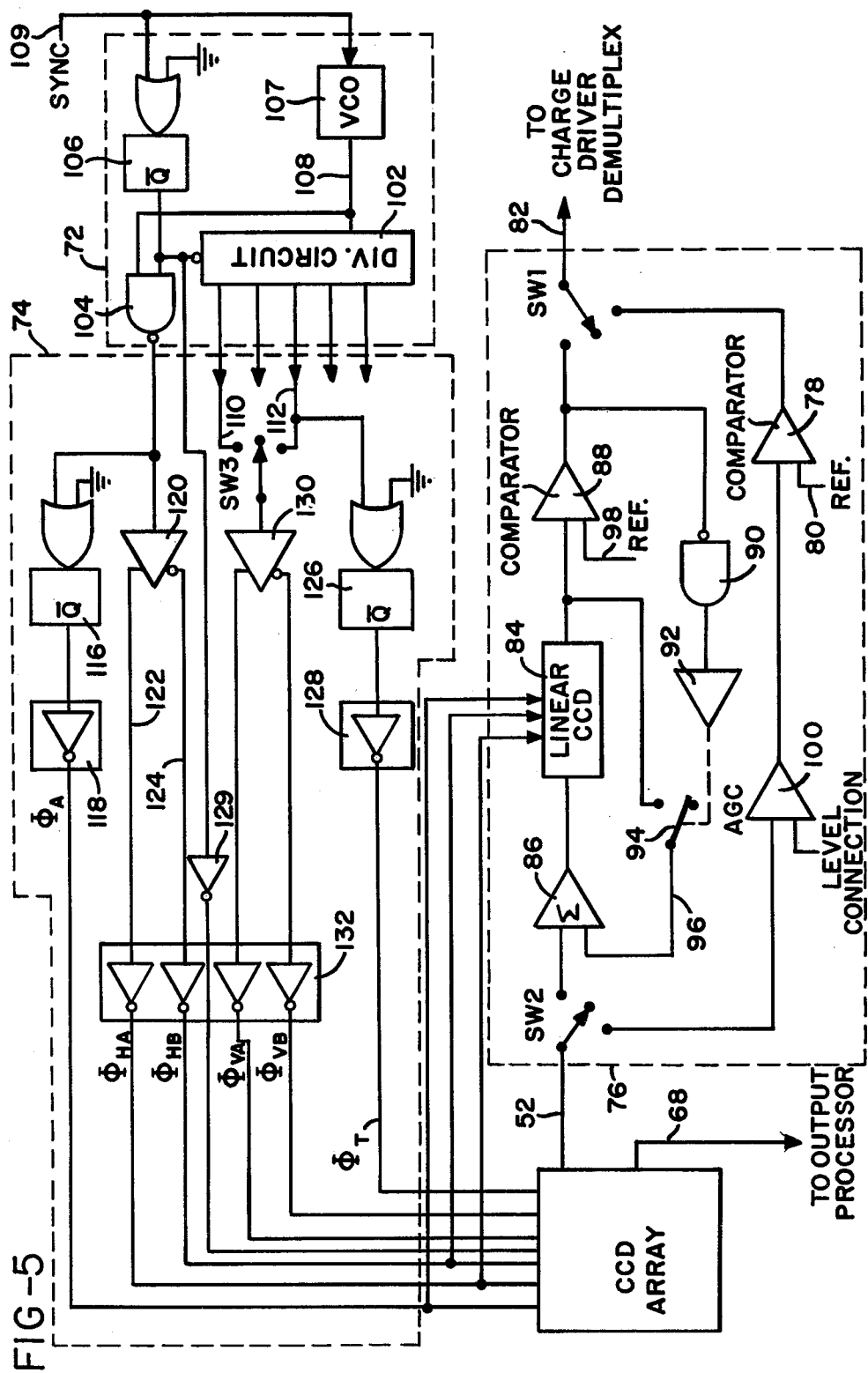
FIG. 5 is a circuit schematic, similar to FIG. 3, showing the timing circuits in greater detail.

FIG. 5 illustrates the pulse generating circuit and clock driver circuit in greater detail. The processor circuit 76 is similar to that shown in FIG. 3 with the exception that a switch SW2 has been added and an amplifier 100 is inserted in the line copy mode processing portion of the circuit to provide for automatic gain control. Switch SW2 is switched into its upper and lower switching states simultaneously with switch SW1. Pulse generating circuit 72 includes a divider circuit 102, NAND gate 104, one shot multivibrator 106 and voltage controlled oscillator 107. Divider circuit 102 receives a clock input on line 108 from oscillator 107 which is a multiple of the pixel rate. This clock input, which may be derived from a tachometer associated with the movement of the scanning mirror or from a reference signal to which the scanning mirror is locked, is set at a frequency of N times the pixel rate and is phase locked to a sync pulse on line 109 which is equal to the pixel rate. The output from the divider circuit on line 110 is a pulse train equal in frequency to the input on line 108 divided by N/16, where 16 sensors are provided in each sensor column. The output on line 112 from the divider circuit 102 is a pulse train having a frequency equal to the input on line 108 divided by N. Thus, the pulse train output on line 112 is equal to the pixel rate. Sync pulses provided on line 114 at the pixel rate generate output pulses on line 113, momentarily disabling pulse generating circuit 72.

Circuit 74 generates the required timing pulses in a straightforward manner. The gating signal $\phi_A$ is produced by a one shot multivibrator 116 having its $\overline{Q}$ output connected to a level adjusting amplifier 118. Similarly, the pulse output from NAND gate 104 is supplied to amplifier 120 having complementary outputs 122 and 124 to produce the $\phi_{HA}$ and $\phi_{HB}$ signal. The $\phi_T$ signal is generated by means of one shot multivibrator 126, having its $\overline{Q}$ output connected to level-adjusting amplifier 128. Signal $\phi_P$ is derived directly from line 113 via level-adjusting amplifier 129. Amplifier 130 is connected to switch SW3 such that outputs may be provided to the level adjusting amplifier circuit 132 at a rate determined by the switching state of switch SW3. When it is desired to operate the image scanner in the gray scale mode, switch SW3 is switched into its upper switching position, connecting line 110 to amplifier 130. Similarly, when it is desired to operate the image scanner in a line copy mode, switch SW3 is switched into its lower switching position, connecting line 112 to amplifier 130. It will be appreciated that the timing circuitry shown, including the pulse generating circuit 72 and clock driver circuit 74, may be implemented in a number of ways, as long as the desired sequence of timing signals results.

It will be appreciated that other processing techniques may be utilized for processing the electrical outputs provided by the sensor array within the scope of the present invention. As an example, the sensor array and pulse generating circuit 72, as well as the clock driver circuit 74 may be operated in the manner suggested above with respect to the line copy mode of operation. As previously described, the column shift registers are shifted in synchronization with the movement of the image across the scanner array such that a pixel area is scanned by each of the sensors in the sensor column of a group. The output from the column shift register is therefore equal to $\overline{Mq}$ where $\overline{q}$ is the average charge generated at each photosensor by the pixel area. The switches SW1 and SW2 may, however, be switched into their upper switching positions with the result that the electrical outputs associated with each of the respective scan lines are integrated by recirculating these outputs through the summer 86 and the shift register 84. When an integrated output exceeds the reference level on line 98, comparator 88 provides a print signal to line 82. As will be appreciated, other signal processing techniques may be utilized within the scope of the present invention to provide print control signals.

While the method herein described, and the form of apparatus for carrying this method into effect, constitute preferred embodiments of the invention, it is to be understood that the invention is not limited to this precise method and form of apparatus, and that changes may be made in either without departing from the scope of the invention.

What is claimed is:

1. An image scanner for scanning a document along a plurality of scan lines and providing a plurality of print control signal pulses in response to the image density of said document along said scan lines, comprising:

means for projecting a moving document image onto a focal plane, a sensor array positioned in said focal plane, said array comprising a first plurality of sensor groups positioned in a row, each of said sensor groups including a plurality of sensors, positioned in a column extending substantially parallel to the direction of image motion, for receiving light from respective pixel areas on said image along a corresponding one of said scan lines and providing electrical outputs related to the image density at said respective pixel areas, a first plurality of column shift registers, each such column shift register associated with a corresponding one of said sensor groups and including a plurality of register stages with each stage receiving an electrical output from a respective one of said sensors in the associated sensor group, each such column shift register responsive to a column shift signal for shiting the electrical outputs in said register stages to adjacent stages in the direction of image motion, said electrical outputs being shifted toward an output stage in each of said column shift resiters, a first row shift register defining a plurality of row register stages, each such row register stage associated with one of said output stages, for storing the electrical outputs from said output stages and shifting said outputs to adjacent row register stages in response to a row shift signal, a plurality of register transfer gate means, each such register transfer gate means connecting an output stage of one of said first plurality of column shift registers and the respective row register stage associated therewith, for transferring to each of said row register stages an electrical output from the associated output stage in response to a transfer signal, and means for generating said column shift signal, said transfer signal and said row shift signal, said row shift signal being equal in frequency to the rate at which successive pixel areas along said scan lines are scanned by each sensor times the number of sensor groups in said first plurality of sensor groups, the frequency of said transfer signal being equal to the rate at which successive pixel areas along said scan lines are scanned by each sensor, and the frequency of said column shift signal being selectable such that it equals the rate at which successive pixel areas along said scan lines are scanned by each sensor, or the rate at which successive pixel areas along said scan lines are scanned by each sensor times the number of sensors in each of said sensor groups.

2. The image scanner of claim 1 further comprising output processor means, responsive to said row shift register, for sequentially comparing each of the electrical outputs stored in said row shift register with a reference electrical potential and providing print control signal pulses when an electrical output exceeds said reference electrical potential, thereby providing line copy print control signal pulses.

3. The image scanner of claim 1 in which the electrical outputs stored in each stage of each of said column shift registers are accumulated in respective output stages thereof prior to application to an associated row register stage in said row shift register by a respective one of said plurality of transfer gate means.

4. The image scanner of claim 3 further comprising output processor means, responsive to said row shift register, for separately accumulating in succession the electrical outputs stored in each stage of said row shift register and periodically comparing the outputs so accumulated with a reference electrical potential, said output processor means providing a print control signal pulse when an accumulated output exceeds said reference electrical potential, thereby providing gray scale print control signal pulses.

5. The image scanner of claim 4 in which said output processor means comprises:

summer means, responsive to said row shift register and to a feedback input, for providing a summer output equal to the sum of the electrical output from said row shift register and the input applied to said feedback input, shift register means, having a number of stages equal to the number of stages in said row shift register, for receiving said summer output signals in a first shift register stage and shifting said summer output signals therethrough in response to said row shift signal to a last shift register stage, feedback means, responsive to a feedback control signal, for supplying the output from said last shift register stage to said feedback input of said summer means, first comparator means for comparing the output from said last shift register stage with said reference electrical potential and providing a print control signal pulse when the output from said last shift register stage exceeds said reference electrical potential, and means, responsive to the occurrence of said print control signal pulses, for preventing said feedback means from supplying the output from said last shift register stage, which output exceeds said reference electrical potential, to said feedback input of said summer means.

6. The image scanner of claim 5 in which said output processor means further comprises:

second comparator means for sequentially comparing each of the electrical outputs stored in said row shift register with said reference electrical potential and providing print control signal pulses when an electrical output exceeds said reference electrical potential.

7. The image scanner of claim 6 in which said output processor means further comprises switch means for selectively providing one of said comparator outputs to a processor output.

8. The image scanner of claim 1, in which said sensor array further comprises a second plurality of sensor groups positioned in a second row, and spaced from said first row of sensor groups in the direction of image motion by a predetermined distance, each of said second plurality of sensor groups including a plurality of sensors, positioned in a column extending substantially parallel to the direction of image motion, for receiving light from respective pixel areas on said image along a corresponding one of said scan lines, the scan lines corresponding to said second plurality of sensor groups interlacing with the scan lines corresponding to said first plurality of sensor groups.

9. The image scanner of claim 8, further comprising a second plurality of column shift registers, each of said second plurality of shift registers associated with a corresponding one of said second plurality of sensor groups and including a plurality of register stages with each stage receiving an electrical output from a respective one of said sensors in the associated one of said second plurality of sensor groups, each such column shift register responsive to a column shift signal for shifting the electrical outputs in said register stages to adjacent stages in the direction of image motion, said electrical outputs being shifted toward an output stage in each of said column shift registers.

10. The image scanner of claim 9 further comprising a second row shift register defining a plurality of row register stages, each such row register stage associated with one of said output stages of said second plurality of shift registers, for storing the electrical outputs from said output stages and shifting said outputs to an adjacent row register stage in response to a row shift signal, and a plurality of register transfer gate means, each such register transfer gate means connecting an output stage of one of said second plurality of column shift registers and the respective row register stage associated therewith, for transferring to each of said row register stages an electrical output from the associated output stage in response to a transfer signal.

11. A method of image scanning for scanning a document along a scan line and providing print control signal pulses for gray scale reproduction of the document along an associated print line on a printed copy in response to the image density along the scan line, comprising the steps of:

(a) measuring the sum of the image densities in an area extending along the scan line and storing said sum to produce an accumulated image density, (b) measuring the sum of the image densities in another area along the scan line, said another area overlapping the area in which the sum of the image densities was previously measured, (c) adding the sum of the image densities measured in said another area to said accumulated density, (d) comparing said accumulated image density to a reference density, and (e) repeating steps (b)–(d) until said accumulated image density exceeds said reference density and, thereafter, providing a print control signal pulse and repeating steps (a)–(e).

12. The method of claim 11 in which successively measured area densities correspond to areas having overlapping portions of uniform area.

13. An image scanner for scanning a document along a plurality of scan lines and providing a plurality of print control signal pulses in response to the image density of pixel areas of said document along said scan lines, comprising:

means for projecting a moving document image onto a focal plane, a sensor array positioned in said focal plane, said array comprising a first plurality of sensor groups positioned in a row, each of said sensor groups including a plurality of sensors, positioned in a column, for receiving light from respective pixel areas on said image along a corresponding one of said scan lines and providing electrical outputs related to the image density of said respective pixel areas, each of said columns extending substantially parallel to the direction of image motion, said sensor array further comprising a second plurality of sensor groups positioned in a second row, and spaced from said first row of sensor groups in the direction of image motion by a predetermined distance, each of said second plurality of sensor groups including a plurality of sensors, positioned in a column extending substantially parallel to the direction of image motion, for receiving light from respective pixel areas on said image along a corresponding one of said scan lines, the scan lines corresponding to said second plurality of sensor groups interlacing with the scan lines corresponding to said first plurality of sensor groups, a first plurality of column shift registers, each such column shift register associated with a corresponding one of said first plurality of sensor groups and including a plurality of register stages with each stage receiving an electrical output from a respective one of said sensors in the associated sensor group, each such column shift register responsive to a column shift signal for shifting the electrical outputs in said register stages to adjacent stages in the direction of image motion, said electrical outputs being shifted toward an output stage in each of said column shift registers, a second plurality of column shift registers, each of said second plurality of shift registers associated with a corresponding one of said second plurality of sensor groups and including a plurality of register stages with each stage receiving an electrical output from a respective one of said sensors in the associated one of said second plurality of sensor groups, each such column shift register responsive to a column shift signal for shifting the electrical outputs in said register stages to adjacent stages in the direction of image motion, said electrical outputs being shifted toward an output stage in each of said column shift registers, a first row shift register defining a plurality of row register stages, each such row register stage associated with one of said output stages, for storing the electrical outputs from said output stages and shifting said outputs to adjacent row register stages in response to a row shift signal, a second row shift register defining a plurality of row register stages, each such row register stage associated with one of said output stages of said second plurality of shift registers, for storing the electrical outputs from said output stages and shifting said outputs to an adjacent row register stage in response to a row shift signal, a first plurality of register transfer gate means, each such register transfer gate means connecting an output stage of one of said first plurality of column shift registers and the respective row register stage associated therewith, for transferring to each of said row register stages an electrical output from the associated output stage in response to a transfer signal, a second plurality of register transfer gate means, each such register transfer gate means connecting an output stage of one of said second plurality of column shift registers and the respective row register stage associated therewith, for transferring to each of said row register stages an electrical output from the associated output stage in response to a transfer signal, means for generating said column shift signal, said transfer signal, and said row shift signal, said row shift signal being substantially equal in frequency to the rate at which successive pixel areas along said scan lines are scanned by each sensor times the number of sensor groups in said first plurality of sensor groups, the frequency of said transfer signal being equal to the rate at which successive pixel areas along said scan lines are scanned by each sensor, and the frequency of said column shift signal being substantially equal to the rate at which pixel areas along said scan lines are scanned by each sensor, and output processor means, responsive to said first and second row shift registers, for sequentially comparing each of the electrical outputs stored in said row shift registers with a reference electrical potential and providing print control signal pulses when an electrical output exceeds said reference electrical potential, thereby providing line copy print control signal pulses.

14. An image scanner for scanning a document along a plurality of scan lines and providing a plurality of print control signal pulses in response to the image density of pixel areas of said document along said scan lines, comprising:

means for projecting a moving document image onto a focal plane, a sensor array positioned in said focal plane, said array comprising a first plurality of sensor groups positioned in a row, each of said sensor groups including a plurality of sensors, positioned in a column, for receiving light from respective pixel areas on said image along a corresponding one of said scan lines and providing electrical outputs related to the image density of said respective pixel areas, each of said columns extending substantially parallel to the direction of image motion, a first plurality of column shift registers, each such column shift register associated with a corresponding one of said sensor groups and including a plurality of register stages with each stage receiving an electrical output from a respective one of said sensors in the associated sensor group, each such column shift register responsive to a column shift signal for shifting the electrical outputs in said register stages to adjacent stages in the direction of image motion, said electrical outputs being shifted toward an output stage in each of said column shift registers, a first row shift register defining a plurality of row register stages, each such row register stage associated with one of said output stages, for storing the electrical outputs from said output stages and shifting said outputs to adjacent row register stages in response to a row shift signal, a plurality of register transfer gate means, each such register transfer gate means connecting an output stage of one of said first plurality of column shift registers and the respective row register stage associated therewith, for transferring to each of said row register stages an electrical output from the associated output stage in response to a transfer signal, means for generating said column shift signal, said transfer signal, and said row shift signal, said row shift signal being substantially equal in frequency to the rate at which successive pixel areas along said scan lines are scanned by each sensor times the number of sensor groups in said first plurality of sensor groups, the frequency of said transfer signal being equal to the rate at which successive pixel areas along said scan lines are scanned by each sensor, and the frequency of said column shift signal being substantially equal to the rate at which pixel areas along said scan lines are scanned by each sensor, and output processor means, responsive to said row shift register, for separately integrating in succession the electrical outputs from each stage of said column shift registers and sequentially comparing each of the integrated electrical outputs with a reference electrical potential, said output processor means providing print control signal pulses when an electrical output exceeds said reference electrical potential, thereby providing gray scale print control signal pulses.

* * * * *